W. J. WADSWORTH.
PAN AND PLATE LIFTER.
APPLICATION FILED AUG. 26, 1911.
1,009,604.
Patented Nov. 21, 1911.
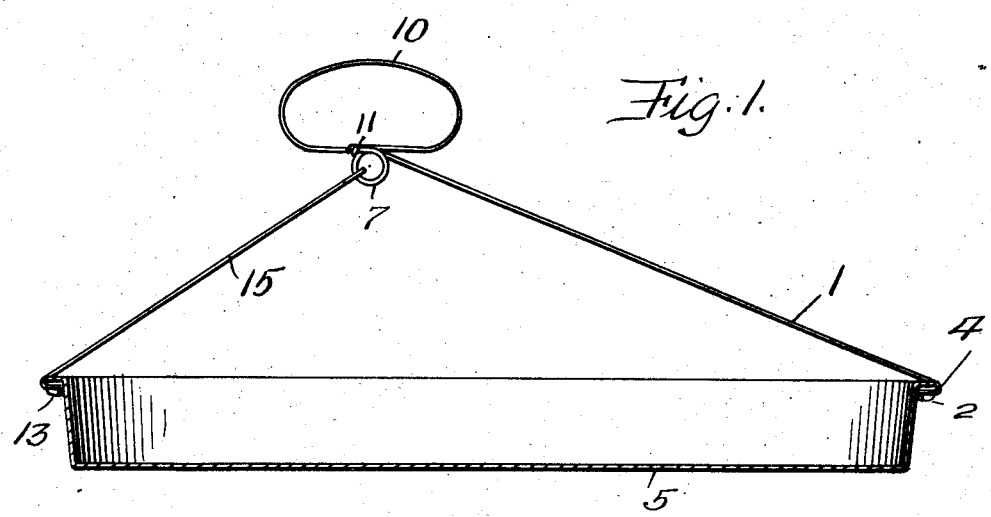
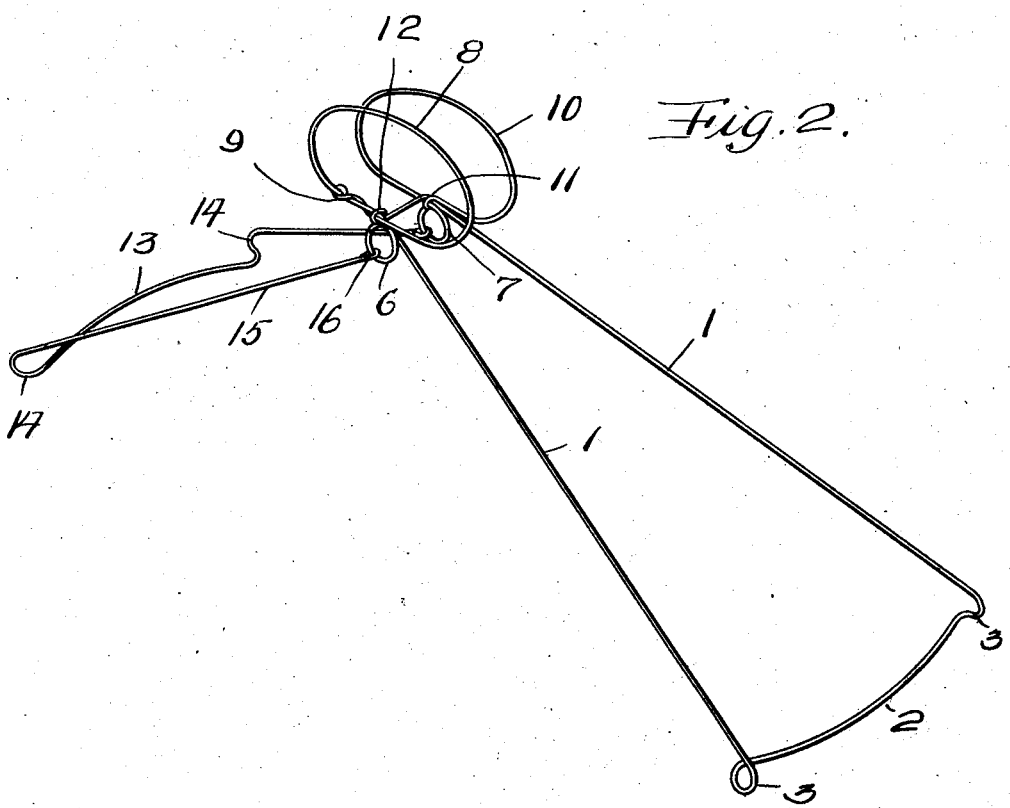
WITNESSES:
INVENTOR.
William J. Wadsworth.
BY
ATTORNEYS.
COLUMBIA PLANOGRAPH CO., WASHINGTON, D. C.

UNITED STATES PATENT OFFICE.

WILLIAM J. WADSWORTH, OF PITTSBURGH, PENNSYLVANIA.

PAN AND PLATE LIFTER.

1,009,604.  Specification of Letters Patent.  Patented Nov. 21, 1911.

Application filed August 26, 1911. Serial No. 646,109.

*To all whom it may concern:*

Be it known that I, WILLIAM J. WADSWORTH, citizen of the United States of America, residing at Pittsburgh, in the county of Allegheny and State of Pennsylvania, have invented certain new and useful Improvements in Pan and Plate Lifters, of which the following is a specification, reference being had therein to the accompanying drawing.

This invention relates to a pan and plate lifter, and the primary object of my invention is to provide a wire lifter that can be employed for lifting hot pans or plates in such a manner that a fluid can be easily poured from the pan or plate.

Another object of this invention is to provide a pan or plate lifter that can be made of two or more pieces of wire readily bent to provide gripping members and handles.

A further object of this invention is to provide a simple, durable, and inexpensive pan lifter that can be readily disposed of as a five or ten-cent article.

I attain the above objects by a mechanical construction that will be hereinafter specifically described and then claimed.

Reference will now be had to the drawing, wherein:

Figure 1 is a side elevation of a pan lifter as applied to a pan, and Fig. 2 is a perspective view of the same.

A pan lifter in accordance with this invention comprises two gripping members, one of said members being bent to provide supports or eyelets for the other member, also handles whereby the lifter can be easily manipulated.

The main lifting member is made of a single piece of wire bent to provide converging arms 1 and the lower ends of these arms are connected by a curved gripping portion 2, and at the juncture of the gripping portion 2 and the arms 1, there are offset portions 3, adapted to engage under the arm or flange 4 of a pan 5. The upper ends of the arms 1 are bent to provide supports or eyelets 6 and 7, the former having the end of the wire bent to provide a loop shaped handle 8, with the end of the wire twisted around that portion of the handle adjacent to the eyelets 6, as at 9. The eyelet 7 terminates in a similar shaped handle 10, and the end of the wire is bent around the eyelet 7, as at 11, and then over and around the lower portion of the handle 8, as at 12. The handles 8 and 10 are maintained in a vertical position and in parallelism, whereby said handles can be easily gripped. The other gripping member is made of a single piece of wire bent to provide a curved gripping portion 13, offset portions 14, converging arms 15, and eyes 16. The eyes 16 are loosely connected to the eyes 6 and 7, and the offset portions 14 are adapted to engage the rim or flange 4 of the pan 5 opposite the gripping portion 2.

In practice, the gripping portion 13 is first placed in engagement with the pan and then the gripping portion 2. With the arms 15 of less length than the arms 1, it is an extremely easy matter to tilt the pan 5 when it is desired to pour liquid from the same; besides, with the arms 15 of less length than the arms 1, the device has the advantage of being more easily placed in engagement with the pan than if the arms were of equal length.

The pan or plate gripping device in its entirety can be made of a non-corrosive or galvanized wire of various sizes.

What I claim is:

A pan and plate lifter comprising a pair of gripping members, each of said members formed from a single piece of wire, one of said members including a pair of inclined diverging arms, each terminating at its upper end in a depending eyelet, each of said eyelets terminating in a vertically disposed relatively large loop, said loops arranged in parallelism and having their lower portions connected together and braced by a transversely-extending member, said arms terminating at their lower ends in an offset gripping portion, the other of said members formed from a single piece of wire bent to provide an offset gripping portion and a pair of inclined diverging arms, said last mentioned arms bent upon themselves at their upper ends, said bent upper ends of said arms connected to said eyelets.

In testimony whereof I affix my signature in the presence of two witnesses.

WILLIAM J. WADSWORTH.

Witnesses:
  MAX H. SROLOVITZ,
  CHRISTINA T. HOOD.

---

Copies of this patent may be obtained for five cents each, by addressing the "Commissioner of Patents, Washington, D. C."